United States Patent [19]
Rieder

[11] 3,864,033
[45] Feb. 4, 1975

[54] AUTOMATIC FOCUSING ARRANGEMENT FOR A SLIDE PROJECTOR

[75] Inventor: Alois Rieder, Munich, Germany

[73] Assignee: AGFA-Gevaert Aktiengesellschaft, Leverkusen, Germany

[22] Filed: May 25, 1973

[21] Appl. No.: 364,079

[30] Foreign Application Priority Data
May 27, 1972 Germany............................ 2225972

[52] U.S. Cl................. 353/101, 250/204, 352/140, 355/55
[51] Int. Cl............................ G03b 3/10, G01j 1/16
[58] Field of Search .............. 353/101, 69; 352/140; 355/55; 250/204

[56] References Cited
UNITED STATES PATENTS

| | | | |
|---|---|---|---|
| 3,264,935 | 8/1966 | Vose.................................. | 353/101 |
| 3,639,048 | 2/1972 | Heaney.............................. | 353/101 |
| 3,649,113 | 3/1972 | Harvey.............................. | 353/101 |

Primary Examiner—Richard E. Aegerter
Assistant Examiner—Steven L. Stephan
Attorney, Agent, or Firm—Michael S. Striker

[57] ABSTRACT

When the slide is in the projection position, a first beam is focussed thereon by a light source mounted in a fixed position relative to the projector lens, and the reflected beam is received by a differential photoresistor also mounted in a fixed position relative to the lens. A second beam is impinged upon the slide, the light from the beam falling on a different position in the slide than the light from the first beam. The second beam is furnished by a light source mounted in a fixed position relative to the slide and the corresponding reflected beam is received by a differential photoresistor also mounted in a fixed position relative to the slide. Each photoresistor forms part of a voltage divider. The center tap of each photoresistor is applied to one input of a differential amplifier whose output controls the direction of rotation of a motor which, through gearing, controls the relative position of the lens to the slide.

9 Claims, 1 Drawing Figure

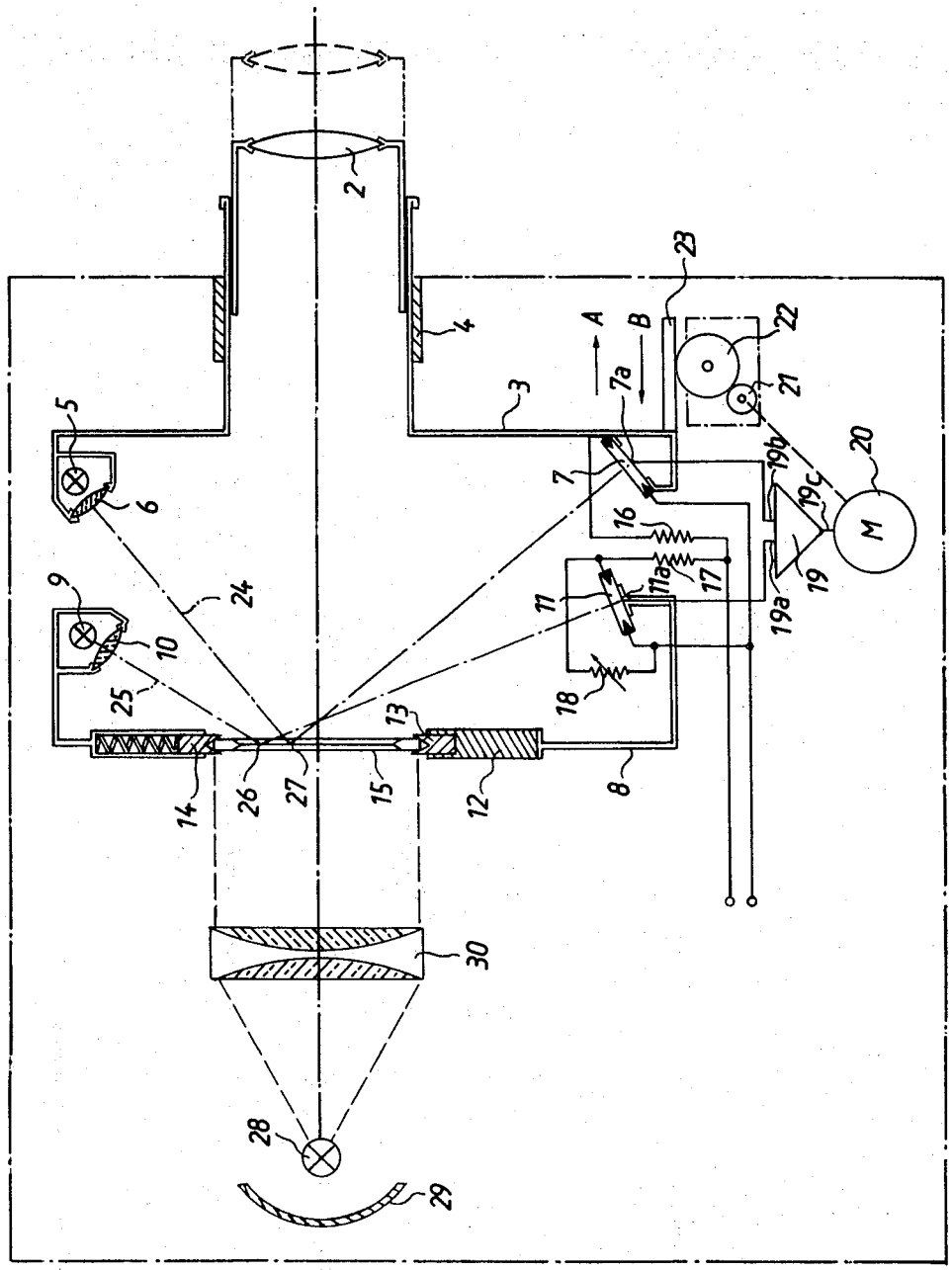

AUTOMATIC FOCUSING ARRANGEMENT FOR A SLIDE PROJECTOR

BACKGROUND OF THE INVENTION

The invention relates to an automatic focusing arrangement for slide projectors. In particular it relates to such automatic focusing arrangements wherein a regulating arrangement including opto-electrical scanning means are utilized in conjunction with a regulating arrangement which drives a motor controlling the position of the projector lens relative to the slide.

The basic principal underlying the focusing arrangement is that the sharp focusing, once set for any one slide, can be maintained by an automatic follow-up arrangement. It is of course a matter of no importance whether the slide is moved relative to the projector lens or vice versa.

Focusing arrangements are known wherein a beam is impinged upon a slide when in the projection position. The correspond beam reflected by the slide corresponding impinged upon a photoreceiver which furnishes a signal corresponding to the position of the reflected beam on the photoreceiver to a regulating arrangement. The regulating arrangement then causes movement of the objective relative to the slide. In such arrangements the electro-optical scanning means are mounted in a fixed position relative to the objective. The photoreceivers are, in general, photoresistors which are arranged in a bridge circuit.

When, however, slides enclosed in glass are used, all boundery surfaces reflect light with different intensities. Further, according to the law of refraction the slide is imaged at a distance offset by about one-third of the thickness of the glass, so that the focal plane no longer coincides with the plane of the slide. Attempts have been made to use optical means such as apertures, masks, filters, etc., to effect a corresponding correction in the opto-electrical scanning means. Further, attempts have been made to adjust the regulating arrangement to correspond to the above-mentioned offset. Further, arrangements are known, wherein two crossing beams are used, the slide being positioned at the crossing point of the beams by a regulating system such as described above. In these systems, the scanning means are mounted in a fixed position relative to the objective, that is they move with the objective when the objective is moved relative to the slide or are mounted in a fixed position in the housing when the slide alone is to be moved.

Further automatic focusing arrangements are known wherein the follow-up works on the basis of a count of the number of reflections or an evaluation of the intensity of the reflected beams.

A further known focusing arrangement makes use of an additional photoreceiver which is mounted to receive a part of the reflected beams from the slide and is used to offset the regulating arrangement correspondingly. All the abovementioned automatic focusing arrangement have the disadvantage that they only operate when it is assumed that the slide is completely planar. However, this only happens when the glass encasing is used. Slides without the glass encasing tend to warp. Thus, the automatic focusing arrangements mentioned above are inoperative, since the beam impinging upon the light is reflected in a manner which cannot be controlled by the arrangement.

It is of course known that the slide film has a natural tendency to assume the shape of a roll, and that this tendency of course is present in the individual slides also. Further, heating during projection causes a warping of the slides, the slide normally assuming either a concave, convex or S-shaped deformation. These deformations arise from the fact that the film is made up of two or more layers of material and that a differential expansion effect takes place which is similar to that of the deformation of bimetallic strips. These deformations cannot be removed since the slide is rigidly mounted within the frame and can exceed the depth of field of the objective, which can result in a disturbing lack of clarity. Moving the scanning point away from the center of the slide can only have even a limited success if the scanning points falls on a plane which is perpendicular to the optical axis of the projector. For any other position of the plane, the beam is reflected in a manner which cannot lead to proper operation of the regulating arrangement.

A further consideration in evaluating the present invention is that at the present there is a tendency to use projection lamps having higher voltage ratings and therefore larger surfaces. Correspondingly, it is desirable to utilize the resulting light fully by using lenses with a higher f stop opening. The larger openings results in smaller depth of field, which in turn results in increased requirements for the automatic focusing arrangements.

SUMMARY OF THE INVENTION

It is an object of the present invention to furnish an automatic focusing arrangement which operates correctly both for glassed-in slides and for warped slides, even if these warped slides have portions which jump from one position to another because of the deformation.

The present invention resides in a slide projector adapted to project a slide mounted in slide holding means and having a projector lens. It is an automatic focusing arrangement which comprises first opto-electrical means mounted in a fixed position relative to said projector lens for impinging a first light beam onto said slide and creating a first test signal in dependence upon the corresponding light beam reflected by said slide. The present invention further comprises second opto-electrical means mounted in a fixed position relative to said slide holding means, for impinging a second light beam onto said slide and creating a second test signal in dependence upon the corresponding light beam reflected by said slide. Further comprised in the present invention are regulator means connected to said opto-electrical means for furnishing a control signal in response to said first and second test signals. Finally, moving means change the position of said projector lens relative to said slide under control of said control signal.

In a preferred embodiment of the present invention, the slide is mounted in a fixed projection position while the position of the projector lens is adjusted relative to the slide under control of said control signal.

Further, in a preferred embodiment of the present invention, the first and second light beams impinge upon said slide in different positions on said slide. The light from at least one of the beams strikes the slide in a position close to the edge of said slide.

In preferred embodiments of the present invention, the opto-electrical means comprise a light source, various optical means such as converging lenses, filters, masks and diaphragms, and photoreceivers.

In a preferred embodiment of the present invention the photoreceivers are differential photoresistors having a center tap.

In a further preferred embodiment of the present invention, the differential photoresistors each constitute part of a voltage divider. The regulator means comprise a comparator having a first and second input, each of the inputs being connected to the center tap of one of said photoresistors. In a preferred embodiment of the present invention the comparator means are a differential amplifier.

In a further preferred embodiment of the present invention a variable resistor is connected in parallel with at least a portion of one of the voltage dividers in order to detune the input to one of the comparator inputs at least to some extent.

Further, a motor is connected to the output of the differential amplifier. The motor constitutes moving means and, in a preferred embodiment of the present invention, drives both the projector lens and the first opto-electrical means in a direction towards and away from the slide under control of the control signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE shows a preferred embodiment of the present invention in schematic form.

DESCRIPTION OF THE PREFERRED EMBODIMENTS

A preferred embodiment of the present invention will now be described with reference to the drawing.

Slide projector 1 has an objective 2, which constitutes one embodiment of projector lens means. Objective 2 is slidably mounted relative to lens carrier 3. Lens carrier 3, which also constitutes part of the projector lens means, is slidably mounted within a guide 4 which is part of the housing. First opto-electrical means, namely a light source 5, a converging lens 6 and a photoelectric transducer 7 are also mounted on lens carrier 3. Second photoelectric means are arranged on a carrier 8 and comprise a light source 9, a converging lens 10 and photoelectric transducing means, here a photoresistor 11. Carrier 8 comprises a slide carrier 12 (slide holding means) which includes a fixed prismatic guide 13 and, on the opposite side of the slide, a spring mounted prismatic guide 14. A mounted slide 15 is inserted between guides 13 and 14 by means of a gripper arrangement which is a conventional arrangement and therefore not shown. When the slide is so mounted, it is mounted in what is herein referred to as the projection position.

In the Figure, the photoelectric transducers 7 and 11 are shown as differential photoresistors which, when combined with fixed resistors 16 and 17 form two voltage dividers which are connected in parallel with each other. The voltage divider comprising resistors 11 and 17 is mounted in a fixed relationship relative to carrier 8. Variable resistor 18 is connected in parallel with photoresistor 11. This variable resistor is used to detune the voltage divider 11, 17 as will be explained below.

Center taps 7a and 11a of photoresistors 7 and 11 respectively constitute the diagonal branch of the bridge circuit which comprises the voltage dividers having resistors 7 and 16, and 11 and 17, respectively. The center taps 7a and 11a are connected to inputs 19a and 19b of comparator 19. Comparator 19 is shown in the Figure as a differential amplifier. It has an output 19c which is connected to the winding of a motor 20, one embodiment of moving means. Lens carrier 3 may be moved in directions A or B by means of motor 20 through suitable gearing 21 and 22 and 23.

In the Figure, the automatic focusing arrangement is shown in the balance position, that is in the position wherein the beams 24 and 25, namely the first and second light beams respectively, have corresponding beams which, after reflection from the slide, fall into the center of the differential photoresistors 7 and 11. In this example it is assumed that slide 15 from which the beams 24 and 25 are reflected at different points 26 and 27, does not have a glass cover and is in an ideal planar position. Slide 15 is illuminated by projection lamp 28, reflector 29 and a set of condensor lenses 30 as is conventional.

Basically, the automatic focusing arrangement operates according to the following principle: The second optoelectrical means 9, 10 and 11 furnish a fixed comparator voltage to comparator 19, this voltage being herein referred to as the second test signal. It depends upon the type and warping of the particular slide 15 being shown. This second test signal is compared to the first test signal which is furnished by the opto-electrical means including elements 5, 6 and 7 which are mounted in a fixed relationship to lens carrier 3. When the two values do not coincide, the differential amplifier 19 furnishes the control signal which controls motor 20 and causes a relative movement of objective 2 and slide 15.

Motor 20 is a reversible DC motor which, in the embodiment shown in the Figure, moves lens carrier 3. The direction of motion of objective 2, that is the direction of rotation of the motor 20, depends upon the sign of the difference of the two signals applied to the input of differential amplifier 19. In this way the distance between the slide and the objective is controlled directly. A first positioning for sharp reproduction of the projected picture when showing the first slide then results in automatic adjustment of the slide projector for all following slides. For the initial adjustment, objective 2 is moved to the position shown by the dashed lines when the projection screen is close to the slide projector, while objective 2 is manually or by motor adjusted to the position shown in the solid lines when the screen is in a relatively distant position from the slide projector.

The operation of the automatic focusing arrangement according to the present invention will now be described with reference to a number of particular operating conditions. The discussion will show that the present system will work satisfactorily for slides which are glassed in, which are not glassed in, which are planar, which are warped or even slides which, during the heating resulting from the projector lamp, undergo further deformation.

The first case to be considered is that of a slide which, because of the natural tendency of the film which has come from a roll, has a shape which is convex relative to slight source 28. Under the heating effect of lamp 28, this tendency is increased. In operation, light beam 25 which falls on a point 26 of slide 15 which is close to the edge of this slide, is reflected to that part of photoresistor 11 which is closer to carrier 8, while beam 24 which is impinged upon point 27 of the slide is only somewhat deflected from the center of photoresistor 7 since point 27 is in a plane which is substantially perpendicular to the optical axis. Motor 20 thus moves lens carrier 3 in direction B for sharp focusing.

The second case generally arises after cooling of a previously projected slide.

In the second case, the slide is deformed in a direction opposite to the original convex direction of the slide relative to lamp 28 prior to "jumping." In this case, beam 24 of the first opto-electrical means is deflected a lesser distance onto that part of photoresistor 7 which is closer to objective 2 than is beam 25 on the corresponding half of photoresistor 11. This unequal deflection of the reflected beams (corresponding beams) corresponding to beams 24 and 25 causes the arrangement of the present invention to move objective 2 in direction A, thereby compensating for the deformation of slide 15.

If the slide now "jumps," that is suddenly changes from a concave to a convex deformation relative to projector lamp 28, the arrangement of the present invention will operate to maintain sharpness as described relative to the first case mentioned above.

For the third case, let it be assumed that the slide is planar. This is the simplest case. In this case, the corresponding beam 25 always falls in the center of photoresistor 11, since the mounting arrangement of the slide assures that the slide always has the same relative position relative to the scanning means 9, 10 and 11. The second test signal thus depends only on the value of the components used for components 11, 17 and 18 and lens carrier 3 is adjusted until such time as the beam corresponding to beam 24 also falls into the middle of the photoresistor 7. This is the case shown in the Figure.

Finally, the case of a glassed slide being projected is to be considered. If one starts with the balanced condition shown in the Figure, the beams correspond to beams 24 and 25 will now fall unto photoresistors 7 and 11 in a direction closer to objective 2. Since, according to the law of refraction, the plane of the picture will be shifted in the direction towards the objective by approximately one-third of the thickness of the glass cover, the variable resistor 18 is used to cause a detuning of the second voltage divider 11 and 17 in such a manner that the second test signal furnishes an indication to regulator means 19 which corresponds to a smaller deflection of beam 25 relative to the deflection of the beam corresponding to beam 24. In this way, the regulator means 19 are forced to operate in such a manner that the focal plane of objective 2 is moved into the image plane by movement in direction A.

The detuning accomplished by means of resistor 18 is taken into consideration when warped slides are being shown in such a manner that the focal plane is always within the area of deformation of the slide. Further of course the opto-electrical arrangement can be mounted in such a manner that beams 24 and 25 impinge upon different sides of slide 15 or upon other convenient points on the slide. Further of course instead of resistor 18 it is possible to use photoresistors which have different characteristic curves. In the simplest case, the two photoresistors may be replaced by a double photoresistance. Of course other types of photoelectric transducers can also be used and in other types of circuits without in any way exceeding the limits of the present invention. The scanning arrangement can further be refined through use of other optical means such as diaphragms, masks and filters.

Thus, although the invention has been illustrated and described as embodied in particular types of opto-electrical, control and moving means, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims:

1. In a slide projector adapted to project a slide and having a projector lens and slide holding means for holding said slide, the relative positions of said projector lens and slide holding means being changeable with respect to each other, an automatic focusing arrangement, comprising, in combination, first opto-electrical means mounted in a fixed position relative to said projector lens for impinging a first light beam onto said slide holding means and creating a first test signal in dependence upon the position of the corresponding light beam reflected by said slide; second opto-electrical means mounted in a fixed position relative to said slide for impinging a second light beam onto said slide and creating a second test signal in dependence upon the position of the corresponding light beam reflected by said slide; regulator means connected to said first and second opto-electrical means, for furnishing a control signal in response to said first and second test signals; and moving means for changing the position of said projector lens relative to said slide holding means under control of said control signal.

2. An automatic focusing arrangement as set forth in claim 1, wherein said first light beam impinges upon a first location on said slide and said second light beam impinges upon a second location different from said first location.

3. An automatic focusing arrangement as set forth in claim 2, wherein at least one of said first and second locations is a location near the edge of said slide.

4. An automatic focusing arrangement as set forth in claim 2, wherein said first and second opto-electrical means comprise a source of light, converging lens means operative on the light from said source of light and photoelectrical transducer means for furnishing said first and second test signals in dependence upon the said light beams corresponding to said first and second light beams.

5. An automatic focusing arrangement as set forth in claim 4, wherein said photoelectrical transducer means comprise a first and second differential photoresistor, each having a center tap.

6. An automatic focusing arrangement as set forth in claim 5, further comprising first and second fixed resistor means respectively connected in series with said first and second photoresistors, thereby forming, respectively, a first and second voltage divider; wherein said regulator means comprises comparator means having a first input connected to said center tap of said first photoresistor, a second input connected to said center tap of said second photoresistor, and a comparator output for furnishing said control signal as a function of the difference between signals at said first and second inputs.

7. An arrangement as set forth in claim 6, wherein said comparator means comprise a differential amplifier.

8. An automatic focusing arrangement as set forth in claim 6, further comprising a variable resistor connected in parallel with at least one of said first in second photoresistors.

9. An automatic focusing arrangement as set forth in claim 6, wherein said moving means comprise a motor connected to said regulator means for driving in a first or second direction in dependence upon the sign of the difference between the signals at said first and second input; and means for directly intercoupling said motor and said projector lens means for removing said projector lens means and said first opto-electrical means in a first or second direction relative to said slide holding means in dependence upon the direction of rotation of said motor.

* * * * *